United States Patent [19]
Davis et al.

[11] 3,732,941
[45] May 15, 1973

[54] VEHICLE CHASSIS RESILIENTLY SUPPORTED ON MAIN FRAME

[75] Inventors: Owen R. Davis, Waukesha; Robert C. Haupt, Milwaukee; Kenneth N. Hansen, Waukesha; Michael L. Slosirek, Milwaukee, all of Wis.

[73] Assignee: Allis-Chalmers Corporation, Milwaukee, Wis.

[22] Filed: May 18, 1971

[21] Appl. No.: 144,451

[52] U.S. Cl........180/89 R, 280/106.5 R, 280/150 C, 280/400, 280/461 A, 296/35 R
[51] Int. Cl. .............................................B62d 33/06
[58] Field of Search ..........................296/35 R, 28 C; 280/106.5 R, 150 C, 405 B, 461 A, 460 A; 180/89; 267/34

[56] References Cited

UNITED STATES PATENTS

| | | | |
|---|---|---|---|
| 2,138,114 | 11/1938 | Nelson | 296/35 R |
| 2,715,041 | 8/1955 | Fierbaugh et al. | 296/35 R |
| 3,036,858 | 5/1962 | Fingerut | 280/150 C X |
| 3,097,879 | 7/1963 | Looper | 296/35 R |
| 2,708,133 | 5/1955 | Sewelin et al. | 296/35 R |
| 3,420,313 | 1/1969 | Walberg et al. | 280/405 B |

FOREIGN PATENTS OR APPLICATIONS

| | | | |
|---|---|---|---|
| 926,834 | 5/1963 | Great Britain | 296/35 R |

Primary Examiner—Leo Friaglia
Assistant Examiner—John A. Pekar
Attorney—rthur L. Nelson, Charles L. Schwab & Robert B. Benson

[57] ABSTRACT

A resiliently mounted chassis including an operator station and a portion of the chassis extending from said operator station with resilient means supporting said chassis on the main frame of the vehicle for insulating the operator from vibration and shock inherent with running of the engine and power transmission, particularly while the vehicle is in operation on rough terrain.

18 Claims, 7 Drawing Figures

PATENTED MAY 15 1973
3,732,941
SHEET 2 OF 5
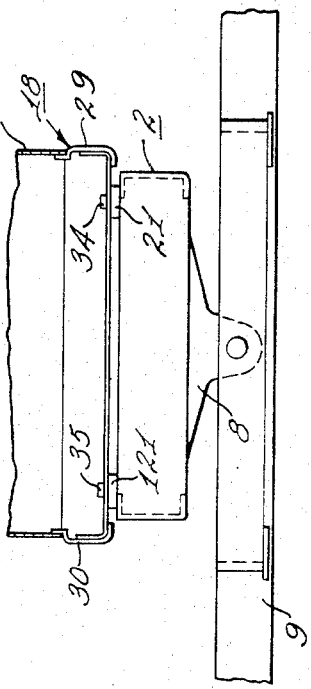
Fig.2
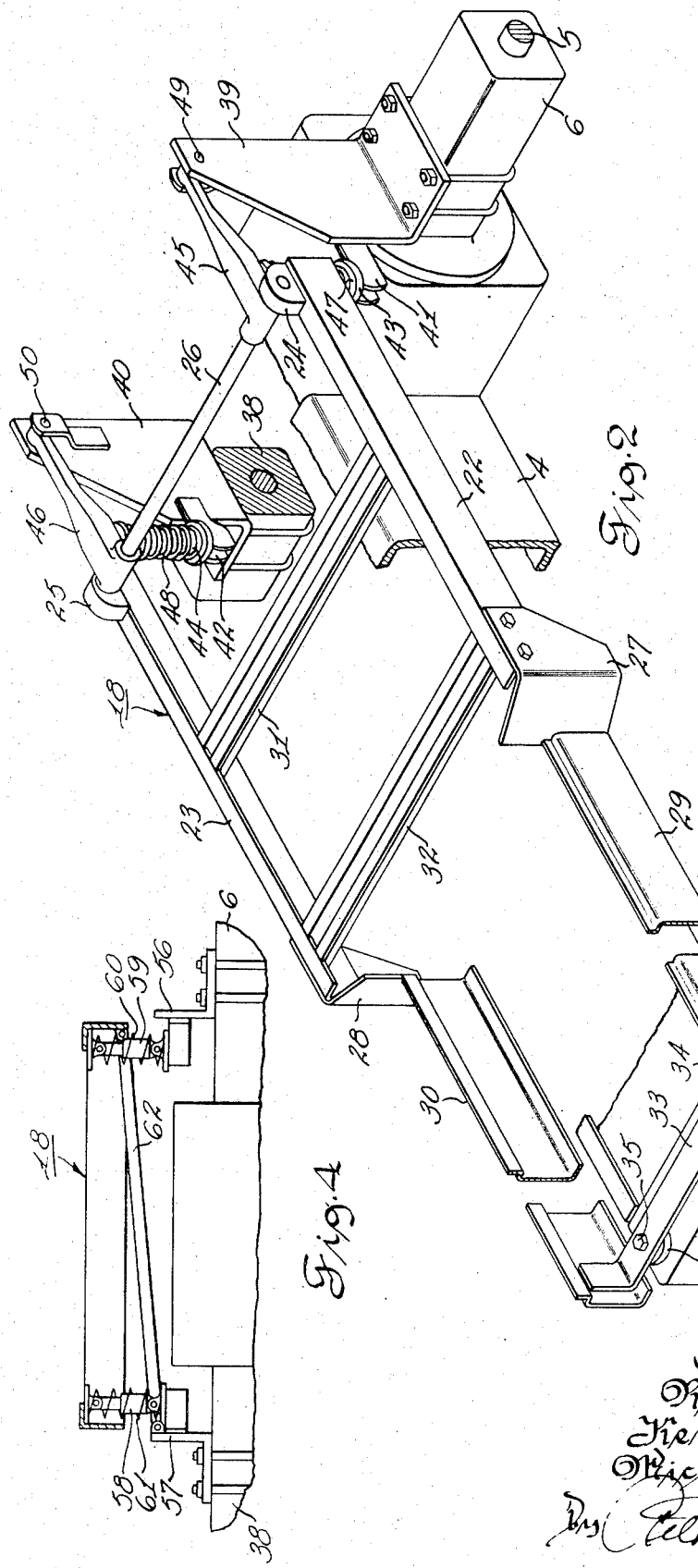
Fig.3
Fig.4
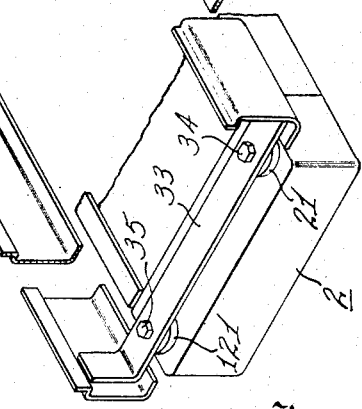
Inventors
Owen R. Davis
Robert C. Haupt
Kenneth R. Hansen
Michael L. Kosiarek
By
Attorney

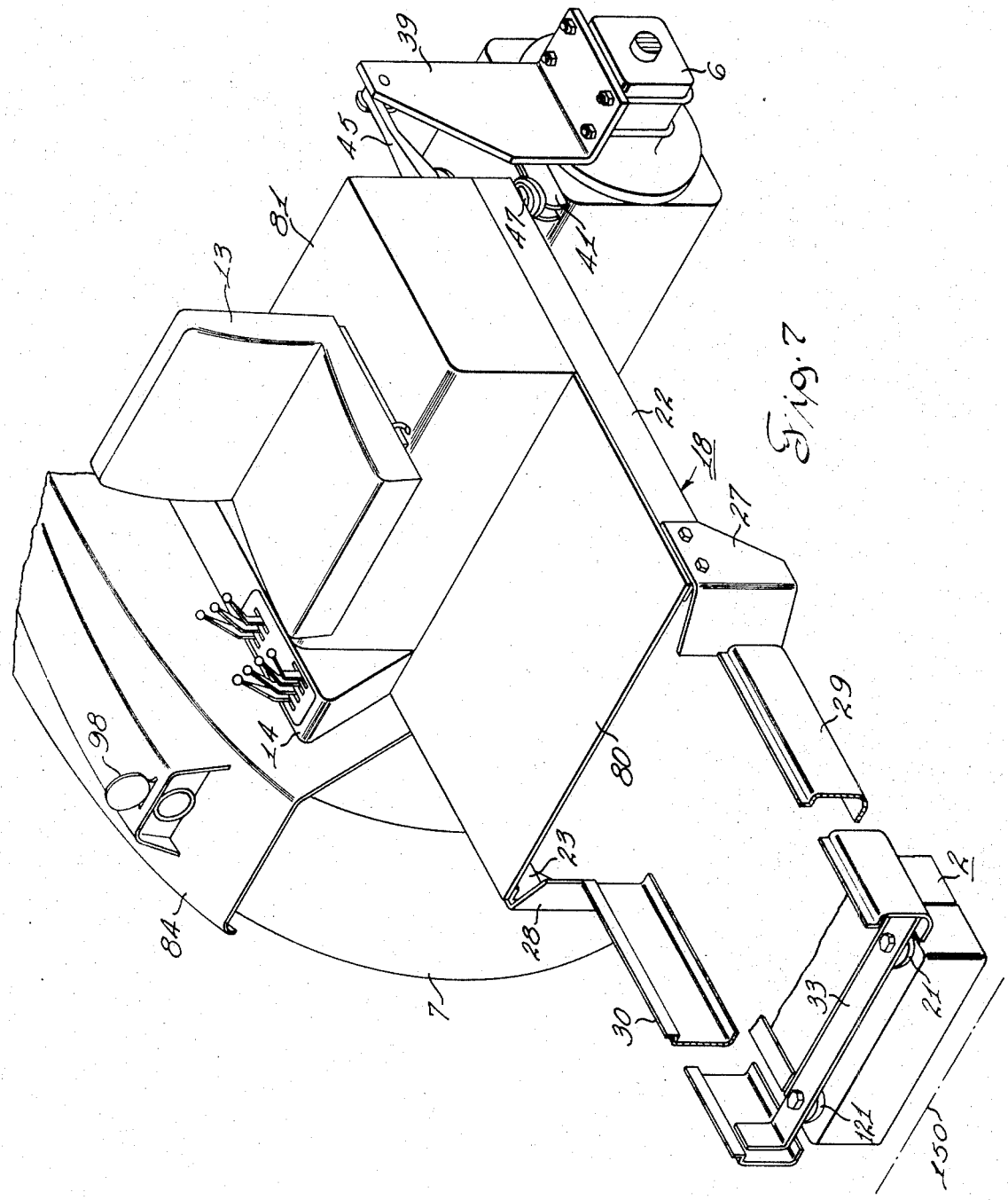

VEHICLE CHASSIS RESILIENTLY SUPPORTED ON MAIN FRAME

This invention relates to a vehicle suspension system and more particularly to a chassis which includes a platform, seat and control mechanism with the chassis resiliently mounted on the main frame of the vehicle. The main frame is supported unsprung on the wheels and generally follows the land contour for controlling the implement movement during operation.

Over the years engineering has been directed primarily to improving the general operation of the engine, the power train, and the drive means to provide adequate draft effort for accomplishing the purpose for which the tractor was designed. With primary concern directed to the tractor and its general operation, limited time has been devoted to improving the operator station and the conditions under which the operator must operate the tractor. Although the seat for the tractor has been improved over the years, and the seat does provide a degree of dampening of vibration and shock normally transmitted to the operator from the tractor, this improvement was not in itself adequate to provide optimum operating conditions, mainly because its design inherently increases relative motion between operator and controls as rough terrain is negotiated at faster and faster speeds. Also, there has been no platform suspension to protect an operator while standing.

Accordingly, with the increase in size and power of the tractor and increasing demands for covering more ground in less time, there has been a corresponding increase in noise, vibration and shock transmitted to the operator. The vibration intensity, noise level, shock and relative motion between operator and controls has increased to magnitudes that the capabilities and limitations of the operator are now becoming of concern to the manufacturer. Vibration, noise and jostling over a continued period of time will also reduce visual acuity, perception and reaction of the operator which may raise a question of safety for the operator and the equipment.

The conventional automobile is designed for greater comfort of the operator than the conventional tractor, and there is much less relative motion between operator and controls on an automobile as it traverses rough terrain conditions. However, to design a tractor along these basic theories is not fully practical. A tractor must provide a base support for the implement which is being drawn by the tractor in order to regulate the level and depth of the implement during its operation and also for controlling the positioning of the implement during its transport mode. It is impractical to have a sprung suspension system between the wheels and the body of the vehicle, as is used in automobile designs.

Accordingly, this invention provides an improvement which substantially enhances the comfort of the operator and provides a convenience in the control mechanisms for reducing the fatigue inherent with operation of tractors. This invention provides a chassis which defines a roomy platform having a control panel, control levers, and steering wheel and associated mechanisms on the chassis in a convenient position for operation of the vehicle. The sheet metal structure carried on the tractor, particularly around the engine hood, has always created and transmitted substantial noise due to the vibration of the engine operating at high speeds. By carrying the sheet metal on the isolated chassis, vibrations are dampened and noise is substantially reduced. The reduced vibration of the mirror supported on the chassis increases its usefulness since the image is not blurred by excessive vibration of the vehicle.

By designing the chassis to include a substantial amount of mass, the size of the operator has little affect in changing the ride characteristics of the chassis on the vehicle. The chassis, therefore includes items such as the hood, fenders, batteries and other items of constant weight, but does not include the fuel tank which changes weight significantly with change in fuel level. The chassis is resiliently supported on the main frame of the vehicle, and accordingly, is insulated from vibration and noise of the main frame which are inherent with operation of a high speed engine and transmission, particularly where the vehicle is operating on rough terrain. The portion of the tractor in the operator's field of view moves in unison with the operator.

Accordingly, it is an object of this invention to provide on a vehicle a chassis with an operator station resiliently mounted on a vehicle main frame to isolate the operator from vibrations caused by operation of the engine, the transmission, and the vehicle traveling on rough terrain.

It is another object of this invention to provide on a vehicle a chassis of substantial mass defining an operator station and engine hood resiliently mounted on the main frame for isolating the operator of the vehicle from vibrations of the engine, the transmission, and the vehicle when traveling on rough terrain.

It is a further object of this invention to provide on a vehicle a chassis defining an operator station with control means and an engine hood resiliently mounted to reduce vibration and noise from the main frame due to power generation and transmission, and vibration generated by the terrain upon which the vehicle is traveling.

It is a further object of this invention to provide in a vehicle an unsprung vehicle frame mounted on wheels for controlling the movement of implement and a sprung chassis of substantial mass suspended on said frame defining an operator station for reducing relative movement between the operator and the controls to create a feeling of stability and assure positive control of the vehicle.

The objects of this invention are accomplished by providing a draft vehicle having a main frame mounted unsprung on wheels which generally follow the contour of the terrain. The main frame provides a means for connection of the implement to control the direction and movement of the implement during operation. Resiliently mounted on the main frame is a chassis which defines an operator station and an engine hood for shielding the engine and transmission. The resilient mounting of the chassis reduces chassis vibration due to engine and transmission operation, as well as the vibrations caused by traveling over rough terrain. With the resiliently mounted chassis carrying the operator station, the operator is not subjected to excessive bouncing on rough terrain and the operator, control levers and steering wheel have little relative motion. Accordingly, the operator's position is not shifted to the extent that it is difficult to easily operate the controls. This enhances safe operating conditions. The noise level and vibration intensity at the operator station associated with operating the vehicle are substantially improved.

The preferred embodiments are illustrated in the attached drawings.

FIG. 2 is a three dimensional view of the chassis mounted on the main frame.

FIG. 3 is a front view of the front end suspension wherein rubber mounts are positioned between the frame and chassis.

FIG. 4 is a view of a modification of the rear end suspension of the vehicle chassis and frame.

FIG. 7 is a three dimensional view similar to FIG. 2 with the control panel and seat mounted on the vehicle chassis.

Figure 1:
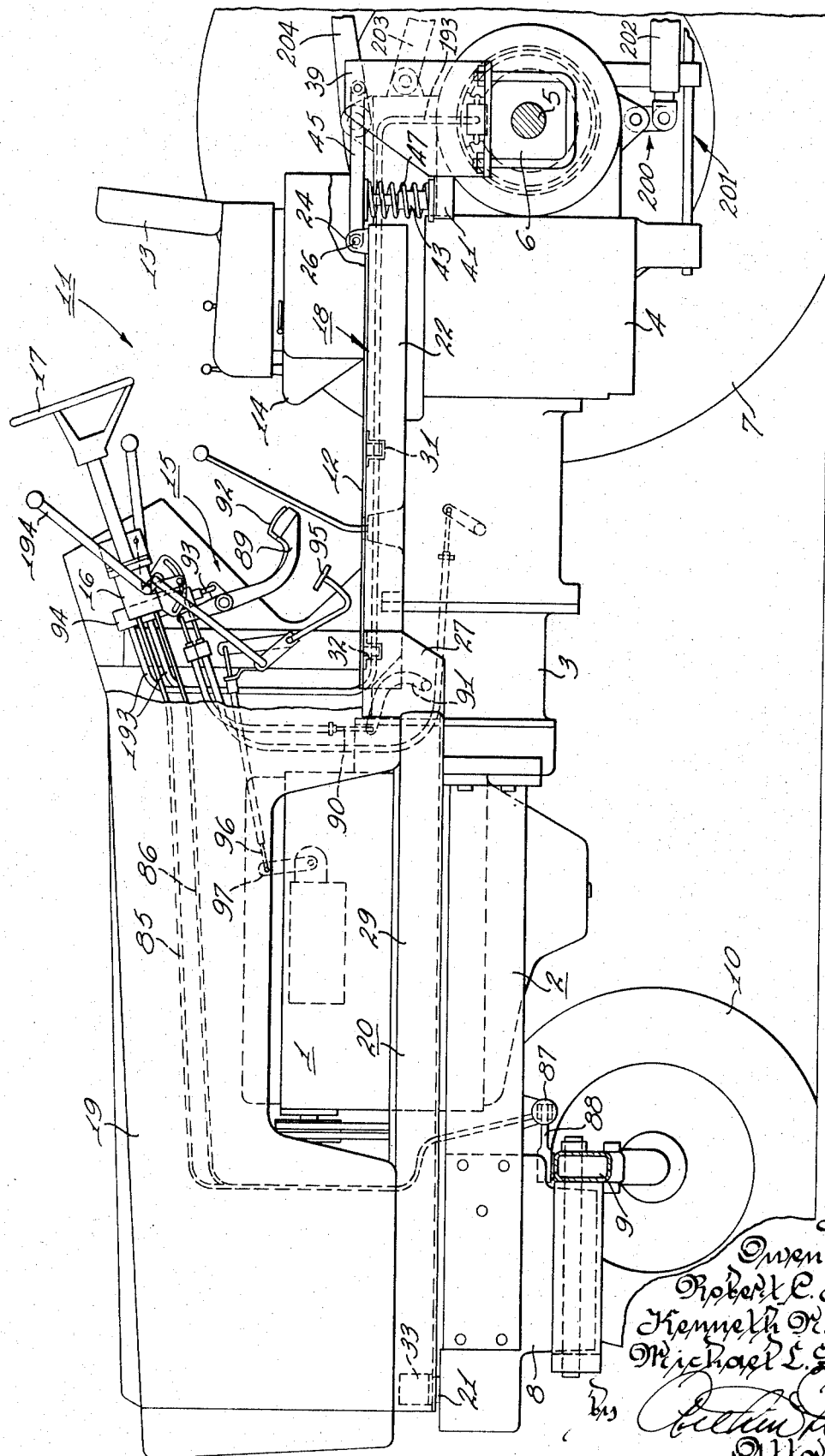
FIG. 1 illustrates a side elevation view of the vehicle with two wheels removed.

Referring to the drawings, FIG. 1 shows a side elevation view of the tractor with two wheels removed to more clearly show the related parts of the tractor. The engine 1 is integrally connected with the main frame 2 and also connected to the transmission 3. The transmission 3 drives through the final drive 4 and rear axle 5. Accordingly, the main frame 2 is rigidly connected to the transmission 3, the final drive 4 and the rear axle housings 6 and 38 to form a rigid assembly. This assembly is unsprung on the wheels and generally follows the contour of the terrain as the rear wheels 7 are driven by rear axles. The drawbar assembly 201 and the 3-point hitch 200 provide a means for connection to an implement. The 3-point hitch includes a pair of lower draft arms 202 and the upper link 203 which are connected on their rear end to the mast of an implement. The rock arms 204 are connected through links to the lower draft arms 202 for raising and lowering of the implement. Accordingly, the main frame including the engine, the transmission and final drive provide structure for positioning and controlling of the implement. The forward end of the tractor is carried on a bracket 8 which is pivotally connected to the front axle 9. The front axle 9 is supported by the front wheels of which wheel 10 is shown.

The operator station 11 is generally defined by the platform 12 which supports the seat 13 and a control panel 14 adjacent to the seat for convenience of operation by the operator of the vehicle. The control module 15 is forward of the operator and adjacent to the steering column 16 which supports the steering wheel 17 for operating the vehicle. The chassis 18 generally supports the structure defining the operator station 11 and also supports the engine hood 19 on a portion 20 of the chassis 18 extending forwardly from the operator station. The portion 20 extends forwardly and is supported on a pair of resilient mounts 21 and 121 which permit flexing and pivoting of the front end of the chassis 18 when the vehicle is in operation.

It is noted that the rear end of the chassis 18 is suspended on resilient members which include dampening devices to reduce the amplitude of oscillation of the chassis in response to movement of the vehicle over rough terrain.

Referring to FIG. 2 the chassis is more clearly illustrated. The chassis consists essentially of a pair of side beams 22 and 23 supporting pillow blocks 24 and 25. The pillow blocks 24 and 25 carry the torsion bar 26 which extends transversely across the rear end of the chassis 18. The side beams 22 and 23 are bolted to mating brackets 27 and 28 respectively, by means of bolts as illustrated. Brackets 27 and 28 are connected on their forward end by a pair of channels 29 and 30 respectively. The crossbars 31 and 32 provide rigidity between the side beams 22 and 23 while the cross member 33 extends transversely to connect the two channels 29 and 30 on the forward end. The cross member 33 is fastened to the main frame 2 by the bolts 34 and 35 and rubber mounts 21 and 121 which provide a resilient connection between the frame and chassis. The bolts 34 and 35, together with the mounts 21 and 121 limit the transverse movement of the forward end of the chassis but permit enough flexibility for pivoting movement of the forward end of the chassis 2.

The brackets 39 and 40 are supported on the rear axle housings 6 and 38. The brackets 39 and 40 have a forwardly extending portion 41 and 42 which support the shock absorbers 43 and 44 respectively. The upper ends of the shock absorbers 43 and 44 are pivotally connected to the arms 45 and 46 of the torsion bar 26. Each shock absorber is also embraced by a spring. Spring 47 encircles shock absorber 43 while spring 48 encircles shock absorber 44. The arms 45 and 46 of the torsion bar 26 extend rearwardly. The arm 45 is pivotally connected by means of a pin 49 to bracket 39 while the arm 46 is connected by a pin 50 to the bracket 40. Accordingly, the chassis 18 is permitted to move upwardly and downwardly on the springs and shock absorbers while its transverse movement is limited by the connection between the pins and the arms of the torsion bar 26. The forward end of the chassis being supported on the rubber mounts 21 and 121 is also limited in its transverse movement, and accordingly, any lateral swaying movement of the chassis is substantially restricted by the manner in which it is connected to the main frame 2.

FIG. 3 illustrates the front axle pivotally connected to bracket 8 supporting the main frame 2. The chassis 18 is supported on the rubber mounts 21 and 121.

FIG. 4 illustrates a modified version of the rear suspension system and is a section view looking rearward toward the rear axle sleeves on the tractor. The rear axle housings 38 and 6 carry the brackets 57 and 56. The brackets 56 and 57 support shock absorbers 59 and 58 respectively. Also springs 60 and 61 encircle shock absorbers 59 and 58 respectively. The chassis 18 is supported on the springs 60 and 61 and shock absorbers 59 and 58 to provide a modified suspension system for the rear end of the tractor. A sway bar 62 is connected between bracket 57 and chassis 18 to counteract swaying movement of the chassis.

Figure 5:
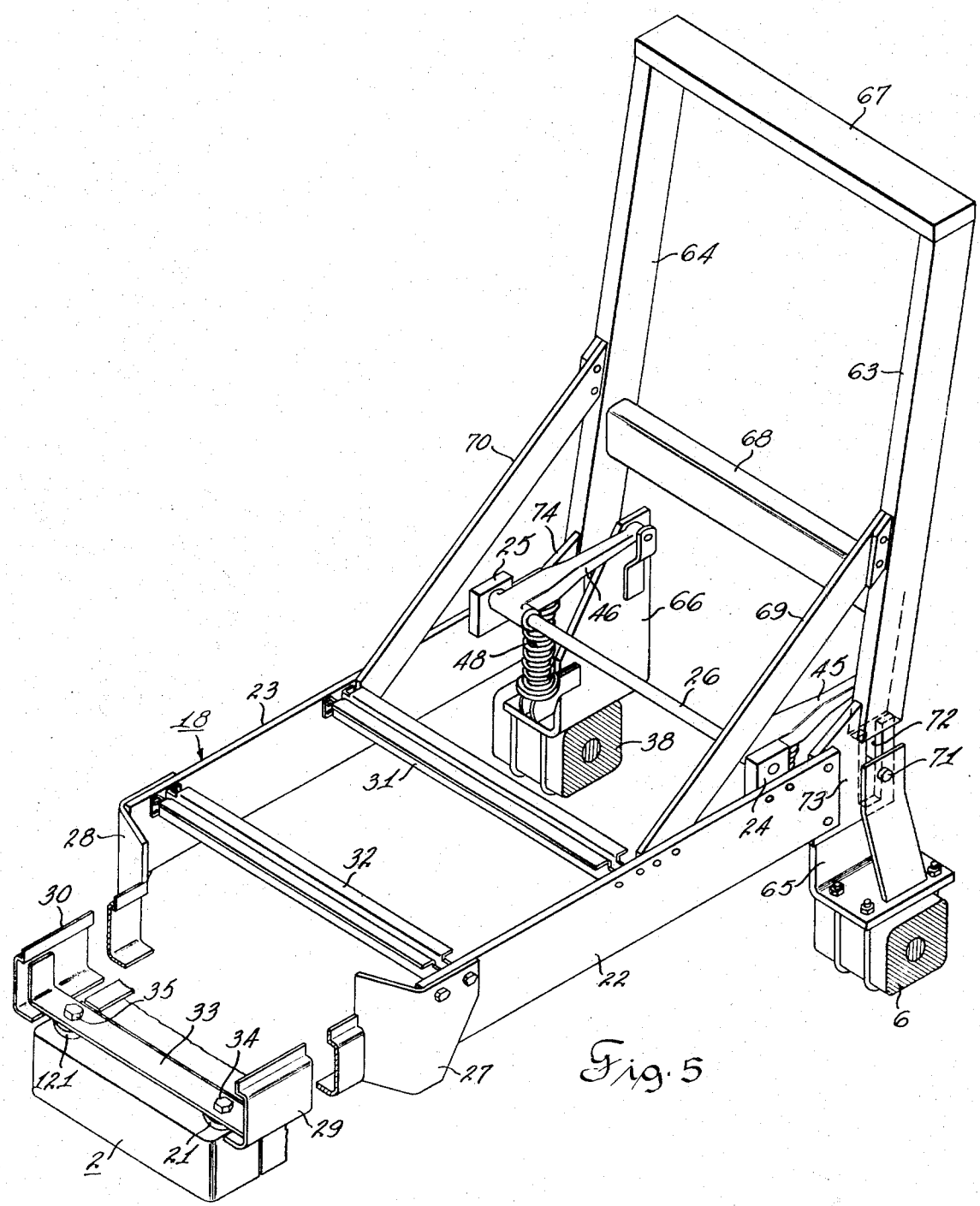
FIG. 5 is a three dimensional view similar to that shown in FIG. 2 with roll bars connected to the vehicle chassis.

Referring to FIG. 5 a modification is shown which includes the roll bars mounted on the chassis 18. Provisions are made in the connection of the roll bars 63 and 64 for limited movement relative to the brackets 65 and 66. The roll bars 63 and 64 are connected by the transverse beams 67 and 68 which rigidly fasten the two roll bars together. The braces 69 and 70 fasten to the forward side of the roll bars 63 and 64 and also engage the side beams 22 and 23 to form a rigid structure of the roll bars on the chassis 18. A pin 71 on the bracket 65 extends through a slot 72 in the gusset 73 which is connected to the roll bar 63 and the side beam 22 to permit limited movement between the roll bar 63 on the frame 2. A similar construction is provided on the gusset 74 on the opposite side of the chassis 18 to permit a movement on the opposite side of the chassis relative to the roll bar 64. It is understood that the movement of the chassis relative to the brackets 65 and 66 is permitted by the suspension system comprising the springs and shock absorbers, as well as as the torsion bar, as previously described. With the slots provided in the gussets 73 and 74 the mounting of the roll bar does not restrict the movement of the chassis relative to the main frame of the vehicle, but provides a firm locking arrangement in event of vehicle upset.

Figure 6:
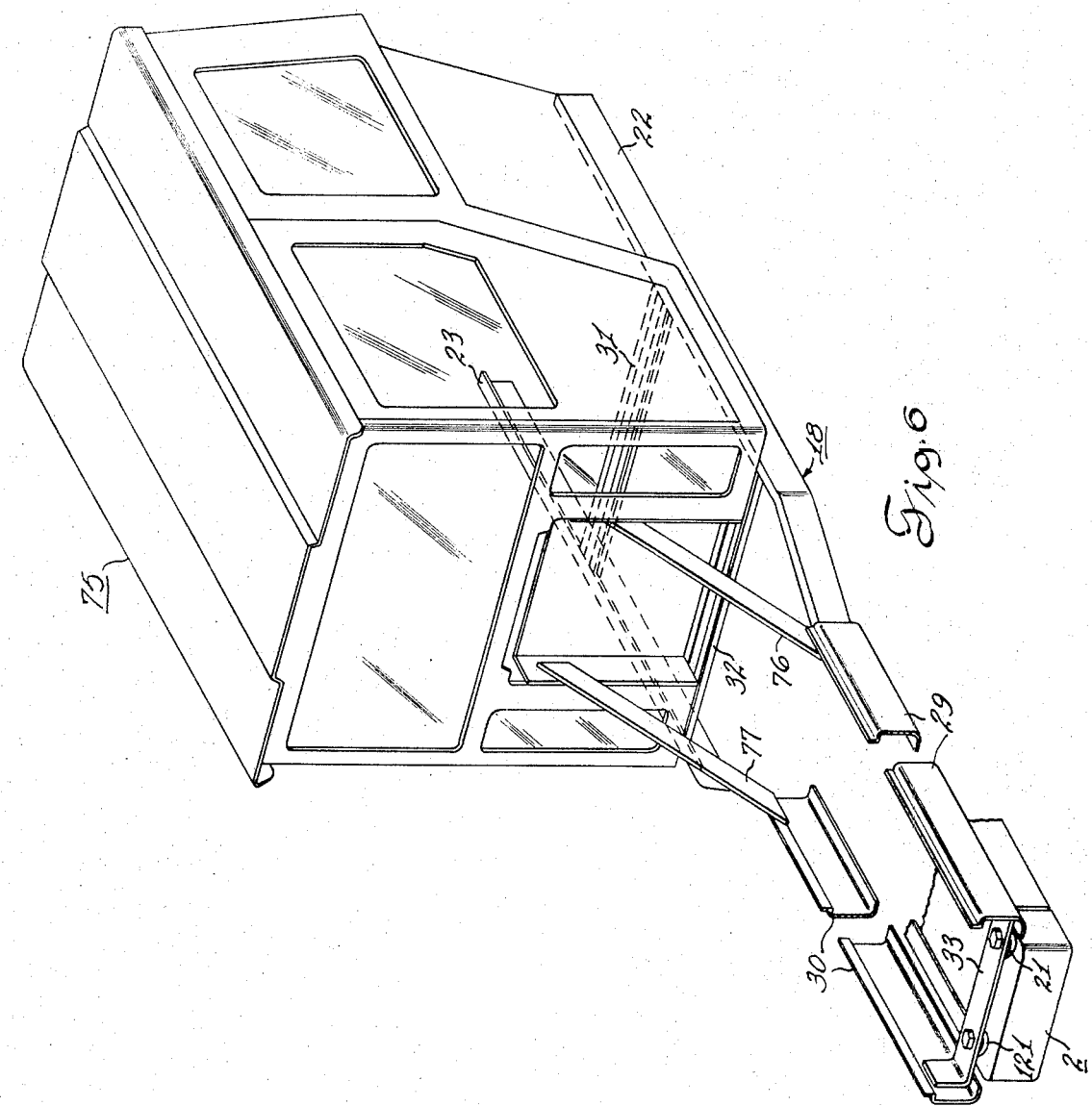
FIG. 6 is a three dimensional view similar to FIG. 2 with a cab mounted on the chassis.

FIG. 6 illustrates a similar construction wherein a cab 75 is mounted on a chassis 18. The braces 76 and 77 extend from the channels 29 and 30, where they are welded. The braces 76 and 77 are also welded to the cab 75. The cab 75 is welded to the side beams 22 and 23 on the underside to provide a unitary structure between the chassis and the cab.

Referring to FIG. 7 the chassis 18 is shown supporting a platform 80. The platform 80 supports a box structure 81 which provides a mounting for the seat 13. A suitable adjustment is provided under the seat 13 to accommodate different sizes of operators for the vehicle. The suspension system under the chassis 18 has been described above. Alongside the seat 13 is a control panel 14 with suitable control levers for controlling the vehicle. The fender 84 is preferably fastened to the platform 80 so the total structure surrounding operator moves with the operator and relative to the main frame of the vehicle.

Referring to FIG. 1 the seat 13 is positioned behind the steering wheel 17. The steering column 16 includes a control mechanism which is connected through hydraulic conduits 85 and 86 which are connected to a hydraulic actuator 87. The hydraulic actuator 87 is connected between the front axle 9 and a steering arm 88. The steering arm 88 is connected to a tie rod for steering of the front wheels 10 in response to operation of the steering wheel 17.

A clutch pedal 89 is connected by a cable 90 to the clutch operating arm 91 while the brake 92 operates the master cylinder 94 through the link 93. Tubing 193 from the master cylinder connects to each rear wheel cylinder. Right and left hand brake levers are used on the tractor although only a single lever is shown in FIG. 1.

A throttle control lever 194 operates a linkage which is also connected to the accelerator pedal 95. This in turn is connected through cable 96 to the throttle arm 97. Accordingly, it is seen that the controls at the operator station operate through a mechanism such as a cable or a flexible hydraulic conduit to operate the controls of the tractor. The levers and supporting structure are mounted on the chassis and give the operator a more secure feeling since the total structure surrounding him moves with him.

FIG. 9 shows the rearview mirror 98 mounted on the fender 84 also moves with the operator station, and the effect of vibrations from the tractor are dampened to provide a clearer view through the mirror. The conventional type tractor rearview mirror often vibrates so much that it is almost impossible to see a clear image through the mirror.

The operation of the device described above will be set forth in the following paragraphs.

Referring to FIG. 1 the main frame 2 is unsprung on the rear wheels 7 and the front wheels 10. The front axle 9 pivotally supports the front end of the tractor. As the tractor is moving over rough terrain, the frame 2 generally follows the contour of the terrain. The main frame provides a means for coupling to an implement. The implement requires a rigid supporting structure, and it is desirable that the frame 2 follows generally the contour of the land and provides a base for control of the implement.

Mounted on the frame 2 is a chassis 18 through resilient supporting means. The forward end of the chassis is mounted on the resilient mounts 21 and 121 which limits movement of the forward end of the chassis. Essentially the rubber mounts 21 and 121 permit a pivotal movement in a vertical plane while substantially restricting any transverse movement.

The rearward portion of the chassis 18 is mounted on the shock absorbers 43 and 44 which are supported on the forward portions 41 and 42 of the brackets 39 and 40. The brackets 39 and 40 are mounted on the drive shaft housings 6 and 38. The shock absorbers 43 and 44 are encircled by the springs 47 and 48. The upper end of the springs 47 and 48 and the shock absorbers 43 and 44 are connected to a portion of the arms 45 and 46 respectively, of the torsion bar 26. The torsion bar 26 is mounted on the pillow blocks 24 and 25 connected to the side beams 22 and 23 of the chassis 18. The arms 45 and 46 extend rearwardly and are pivotally connected to the brackets 39 and 40. Accordingly, it can be seen that the rearward end of the chassis 18 can move upwardly and downwardly in a pivoting movement which pivots at the forward end of the mountings 21 and 121. The rear end of the chassis 18 moves against the springs 47 and 48. If one side of the chassis 18 is depressed, this movement is resisted by the torsion bar 26, since the opposite side of the torsion bar being connected through the arm to its mating bracket will tend to remain in this position. For instance, if the left hand side of the chassis 18 is moved downwardly, the arm 45 will rotate about the torsion bar 26 while the arm 46 connected to the bracket 40 will tend to remain in the position in which it normally was at rest. Accordingly, the torque in the bar 26 will tend to prevent the chassis from tilting and tend to restore it to its original rest condition due to the stress in the bar. The shock absorbers absorb shock and tend to delay a sudden movement of the chassis which may be caused by roughness in the terrain as the wheels pass over the uneven area.

Although FIG. 1 illustrates a chassis substantially equal to the length of the frame, a chassis substantially equal to the wheel base has some advantage, particularly where the frame substantially overhangs the wheels. This modification is illustrated in FIG. 7 where the center line 150 defines the center of the front axle. It is understood that the wheel base on crawler type vehicles would be defined by the idlers and drive sprockets.

Referring to FIG. 4, a modified version of the rear suspension system is illustrated. The brackets 56 and 57 are mounted on the drive shaft housings 6 and 38. The shock absorbers 59 and 58 are mounted on the brackets 56 and 57 while the upper end of the shock absorbers are connected to the chassis 18. The springs 60 and 61 are also connected between the brackets 56 and 57 and the chassis 18 respectively. The shock absorbers operate in the same manner as that described for the suspension as shown in FIG. 1, however, the sway bar 62 is used to control lateral sway of the chassis relative to the main frame 2. A sway bar 62 is connected to a bracket 57 and the chassis 18 and extends transversely across the vehicle. As the vehicle moves upwardly and downwardly and the sway bar 62 pivots on its two pivotal ends, its longitudinal stiffness tends to maintain the chassis 18 in a substantially vertical relationship relative to the frame 2.

Referring to FIG. 5 roll bars are illustrated which will operate as a safety device on the vehicle. It is understood that the roll bars are carried on the chassis and movement is permitted between the chassis 18 and the main frame 2 by means of the slots cut in the side of the gussets 73 and 74. This will permit limited relative movement between these two members but if, however, a sudden force is imposed on the roll bars 63 and 64, movement is limited and they lock with the frame to operate as a solid protective device to prevent injury in case of upset or roll over of the tractor.

FIG. 6 illustrates a cab which is mounted on the chassis 18 and FIG. 7 generally illustrates the operator station on the vehicle. FIG. 7 illustrates the chassis carrying the operator station which provides a roomy area in good operating condition for the operator of the vehicle. These two views generally show refinements of the device, as shown in FIG. 1, and provide an added means whereby the operator can control the vehicle within a ventilated cab which further deadens and reduces sounds caused by operation of the vehicle.

The embodiments of the invention in which an exclusive property or privilege is claimed are defined as follows:

1. A tractor comprising, a main frame including the engine and drive assembly mounted unsprung on wheels for generally following the contour of the terrain, means on said frame for positioning and controlling an implement, a chassis of substantial length defining an operator station and including beam structure providing rigidity and extending from said operator station, suspension means mounted on said frame and supporting said chassis including, resilient means supporting said chassis on at least two transversely spaced points at said operator station permitting substantial movement between said chassis and said frame, vibration dampening means connecting said chassis with said frame on at least two transversely spaced points at said operator station, at least two resilient elements mounted on said frame and supporting said chassis at transversely spaced points and stabilizing the end of said chassis remote from said operator's station thereby isolating said chassis from the shock and vibrations of the main frame of said vehicle and provide a cushioned support under the operator station.

2. A tractor as set forth in claim 1 wherein said suspension means includes sway restricting means connected between said vehicle chassis and said frame to limit the transverse sway of the chassis relative to the main frame.

3. A tractor as set forth in claim 1 wherein said resilient means includes a sway bar connected to said main frame and said chassis to limit the transverse sway of the chassis relative to said main frame.

4. A tractor as set forth in claim 1 wherein said vibration dampening means comprise two shock absorbers connected between said main frame and said chassis to reduce shock transmission between said main frame and said chassis.

5. A tractor as set forth in claim 1 wherein said operator station defines control levers, and a steering means for controlling the operation of said vehicle.

6. A tractor as set forth in claim 1 wherein said chassis includes protective bars integral with said chassis to thereby provide a protective device at said operator station.

7. A tractor as set forth in claim 1 wherein said suspension means include a torsion bar, means pivotally supporting said torsion bar on said chassis, means defining a pair of arms extending from said torsion bar, means pivotally connecting said arms to said main frame to thereby provide restricted lateral movement of said chassis relative to said frame and restrain said vehicle chassis in tilting relative to aid main frame.

8. A tractor as set forth in claim 1 wherein said chassis includes fenders.

9. A tractor as set forth in claim 1 wherein said chassis includes a platform.

10. A tractor having a plurality of wheels defining a wheel base of a predetermined length comprising, a main frame including the engine and drive assembly mounted unsprung on said wheels for generally following the contour of the terrain, means on said frame for positioning and controlling an implement, a chassis of substantially the same length as the vehicle wheel base defining an operator station including beam structure providing rigidity and extending from said operator station, suspension means mounted on said frame and supporting said chassis including, resilient means supporting said chassis on at least two transversely spaced points at said operator station permitting substantial movement between said chassis and said frame, vibration dampening means connecting said chassis with said frame on at least two transversely spaced points at said operator station, at least two resilient elements mounted on said frame and supporting said chassis at transversely spaced points and stabilizing the end of said chassis extending from said operator station thereby isolating said chassis from the shock and vibrations of the main frame of said vehicle and provide cushioned support under the operator station.

11. A tractor as set forth in claim 10 wherein said resilient means supporting said chassis includes two coil springs connecting said main frame with said chassis on at least two transversely spaced points at said operator station.

12. A tractor as set forth in claim 10 wherein said resilient elements of said suspension means define two rubber mounts on said frame positioned on opposite sides of the end of said chassis.

13. A tractor as set forth in claim 10 wherein said beam structure of said chassis includes means supporting an engine hood extending forwardly of said operator station to thereby reduce the vibrations of the engine hood and reduce noise at the operator station.

14. A tractor as set forth in claim 10 wherein said chassis includes a cab positioned at said operator station to thereby isolate said operator station from noises responsive to operation of said vehicle.

15. A tractor as set forth in claim 10 wherein said chassis includes a seat.

16. A tractor as set forth in claim 10 wherein said chassis includes control levers and a steering wheel.

17. A tractor as set forth in claim 10 wherein said chassis includes fenders and at least one mirror.

18. A tractor as set forth in claim 10 wherein said chassis includes, a platform, an operator seat, fenders, control levers, and a steering means.

* * * * *